United States Patent [19]

Tsui et al.

[11] Patent Number: 5,056,965
[45] Date of Patent: Oct. 15, 1991

[54] METHOD OF CONTROLLED INVENTORY FOR BUSHINGS

[75] Inventors: Gary Tsui, Rosemead; Thomas Heimbigner; Fred Pearl, both of Bellflower, all of Calif.

[73] Assignee: CBC Industries, Inc., City of Commerce, Calif.

[21] Appl. No.: 539,070

[22] Filed: Jun. 14, 1990

Related U.S. Application Data

[63] Continuation-in-part of Ser. No. 432,420, Nov. 3, 1989, abandoned, which is a continuation of Ser. No. 223,429, Jul. 25, 1988, abandoned, and a continuation-in-part of Ser. No. 426,493, Oct. 23, 1989, abandoned, which is a continuation of Ser. No. 233,116, Aug. 15, 1988, abandoned, which is a continuation-in-part of Ser. No. 223,429, Jul. 25, 1988, abandoned.

[51] Int. Cl.$^5$ .............................................. B23B 49/02
[52] U.S. Cl. .................................. 408/72 B; 76/101.1; 408/115 B; 408/241 B
[58] Field of Search ............. 408/72 B, 115 B, 241 B; 76/1, 101.1

[56] References Cited

U.S. PATENT DOCUMENTS

| | | | |
|---|---|---|---|
| 2,424,485 | 7/1947 | Miller | 408/115 B |
| 2,942,500 | 6/1960 | Conner | 408/72 B |
| 2,997,902 | 8/1961 | Conner | 408/241 B |
| 3,119,287 | 1/1964 | Roberts et al. | 408/241 B |
| 4,131,385 | 12/1978 | Narang | 408/72 B X |

Primary Examiner—Steven C. Bishop
Attorney, Agent, or Firm—Beehler & Pavitt

[57] ABSTRACT

In the business of supplying bushings as tool guides for machine operations a minimum of two types of bushings need to be stocked. One type is a headless press fit sleeve. The other type is a slip fit sleeve with a head at one end. The headed slip fit type is desirable but greatly more costly. Such a great number of different sizes need to to stocked by the supplier that the cost of maintaining two complete inventories, one of each type, often becomes prohibitively expensive. The invention here involved makes use of only one complete inventory of bushings of the less costly and simpler press fit type and a partial inventory of separate heads which can be fitted on the press fit sleeve, modified to only a minor degree, and in this way to supply an order for the normally more costly headed slip fit bushing.

12 Claims, 3 Drawing Sheets

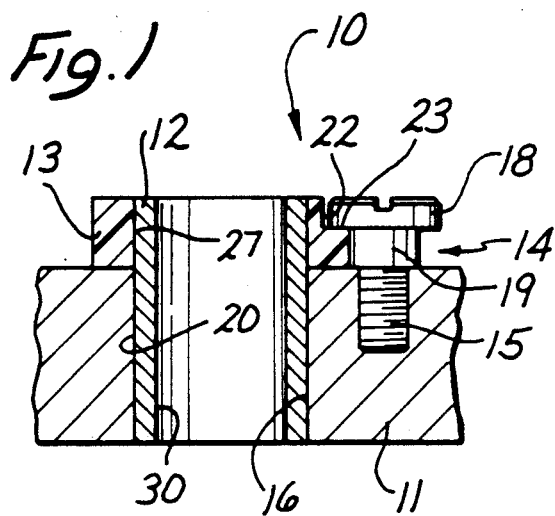
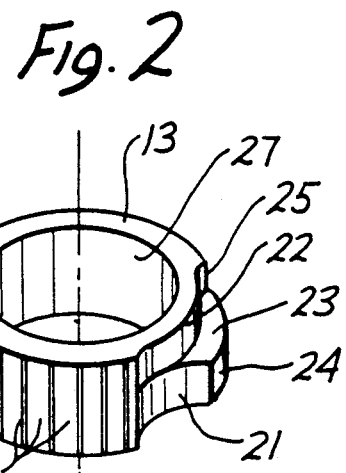
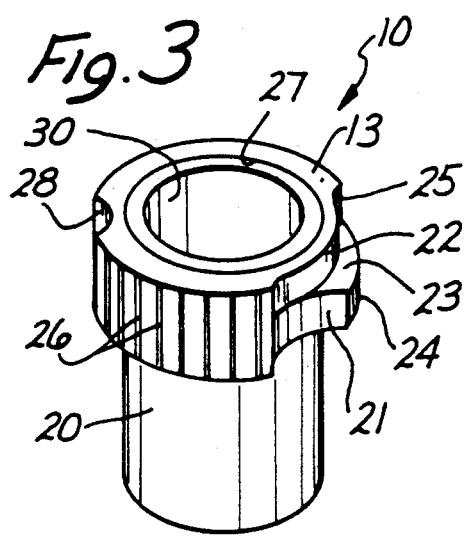
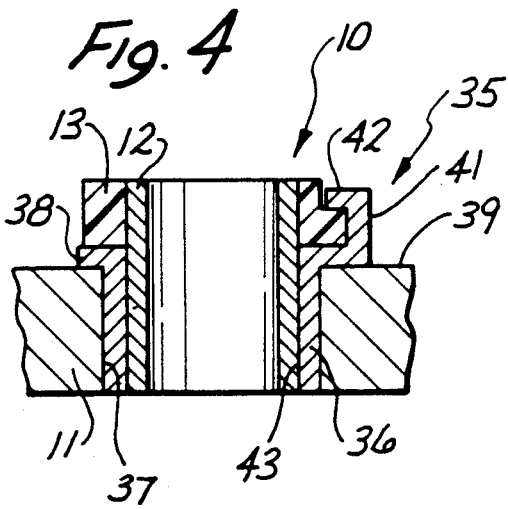
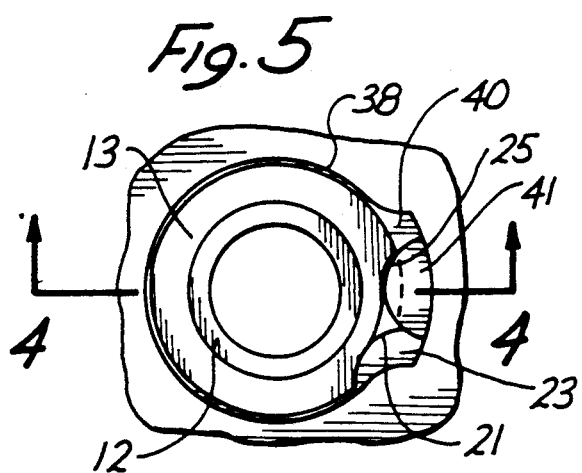

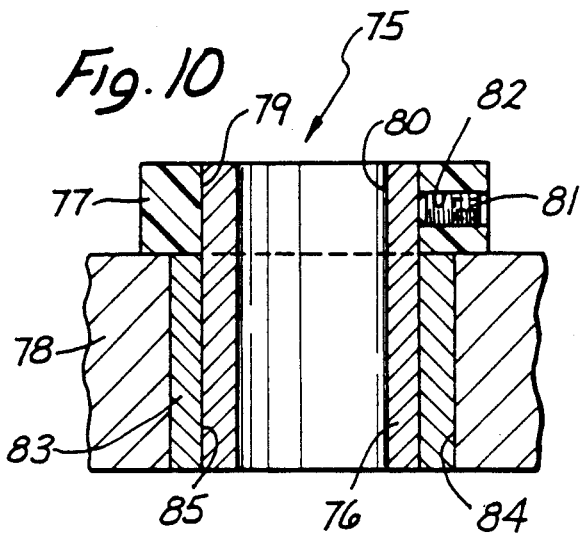
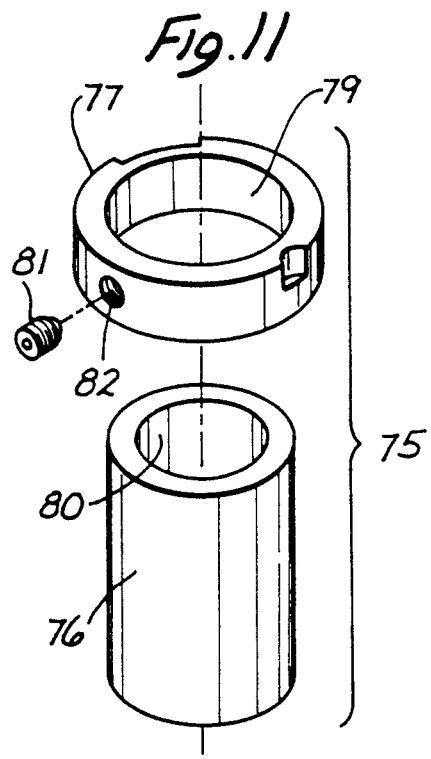
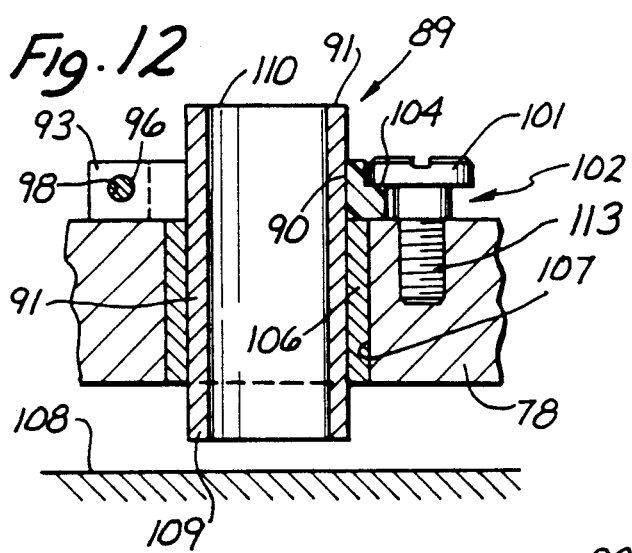
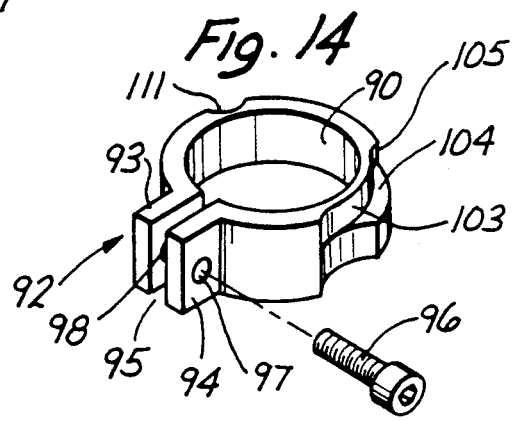
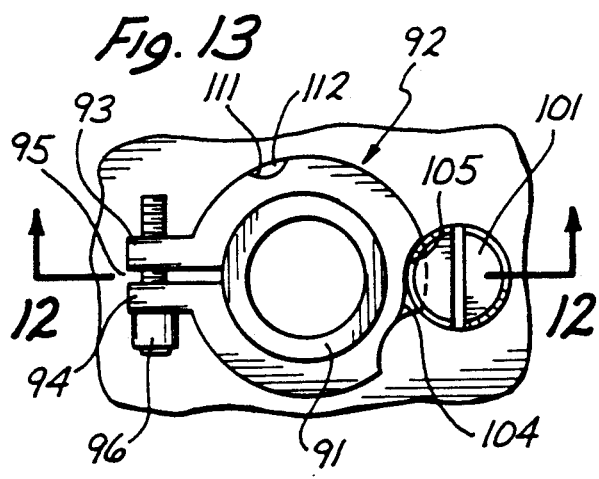
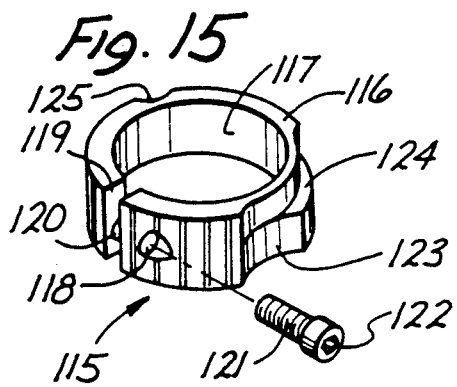

METHOD OF CONTROLLED INVENTORY FOR BUSHINGS

This is a continuation-in-part of application Ser. No. 432,420, filed Nov. 3, 1989, now abandoned, which is a continuation of Ser. No. 223,429, filed July 25, 1988, now abandoned; and a continuation-in-part of Ser. No. 426,493, filed Oct. 23, 1989, now abandoned, which is a continuation of Ser. No. 233,116, filed Aug. 15, 1988, now abandoned, which is a continuation-in-part of Ser. No. 223,429, filed July 25, 1988, now abandoned.

Bushings which serve as tool guides, commonly referred to as drill bushings, are those which in use are mounted in a jig or fixture. The jig is of a character to be located in a predetermined position near the workpiece so that the tool, most frequently a twist drill, is guided to the predetermined spot on the workpiece where a hole is to be drilled.

Precision tool bushings are regularly made of heat-treated steel so that they will not wear out though experiencing a great many repeated operations. The bushings are machined and/or ground to the desired dimensions. Tool bushings are used in large quantities throughout the manufacturing arts. In order to facilitate the design of fixtures and jigs, standards have been established for the lengths and inside and outside diameters of tool bushings. The outside diameter standards provide for two different mounting options, namely, slip fit and press fit.

Press fit bushings are most commonly and widely used. These are heat-treated metal sleeves having an outside diameter large enough so that it has a tight fit in a corresponding hole in the jig. Bushings ultimately wear out and need to be replaced. A press fit bushing must be forcibly driven free of its engagement with the jig and then a replacement bushing driven into the hole of the jig in its place. The replacement operation is time-consuming and correspondingly costly. Occasionally the bushing and/or the jig is damaged in the process.

There are other occasions when the machining operation calls for use of two or more different tools of different diameter for work in the same drilled hole in the workpiece. For example, the initial drilled hole may need to be reamed for tighter tolerance or tapped and its entrance end countersunk. For such successive operations the jig remains in place but the bushing is removed and a succession of different bushings made use of at the same location.

On frequent occasion there may be need to remove the sleeve and replace it with a sleeve of larger inside diameter for a second drilling operation in the same hole in the workpiece. For such a replacement to be made, the same procedure would be used. Still a third replacement might be needed on occasions as when the drilling of a countersink or tapping might be needed for the already drilled hole.

Substitution of bushings in this manner is better accomplished by use of a slip fit bushing of the fixed renewable or slip renewable type. A slip fit bushing is one which includes a head portion that provides a means of interlocking the bushing with the jig. The interlock is readily releasable. Typically, the slip renewable bushing is slipped into the hole in the jig and rotated in one direction to lock it in place. To make an exchange of this kind, the bushing is merely rotated in the reverse direction to disengage the interlock. The slip fixed bushing is normally held in place by a releasable fastener element such as a machine screw. The cost of making the exchange with a slip fit bushing is negligible compared to that of replacing a press fit bushing. The cost saving is, however, significantly reduced by the high initial cost of the conventional slip fit bushing. For a given internal diameter the standard slip fit bushing generally has a slightly smaller outside diameter than the corresponding press fit bushing. Where there are holes of many different sizes to be drilled and at assorted different locations on the workpiece, it can be readily understood that the cost of providing conventional slip fit bushings for such a drilling operation can be considerable.

These and other disadvantages of the prior art have been overcome according to the present invention. For an outline of the value of the inventive method of the present invention, it should be understood that it is the preference of the industry to use press fit type bushings because of lower cost. Press fit bushings are headless tubular sleeves of specific inside diameter, outside diameter and length. In the production of bushings, cylinders are cut from rod to the length desired, an axially extending bore is formed, and the inside and outside circumferences ground to the needed sizes. Heat treating or other hardening is necessary for long wear. A great many different sizes must be stocked for an inventory to be effective. Sleeves of one inside diameter size, for example, must be stocked in many different lengths and different outside diameters.

To reduce the man hours of labor involved in removal and replacement of press fit bushings, industry has had recourse to slip fit bushings. As noted above, bushings of the slip fit type are sleeves provided with a head. The outside diameter of the sleeve is made smaller than the hole in the jig so that the sleeve will slide into the hole unobstructed and be held in place by engagement of the head with an element at the top surface of the jig. In the interest of precision, the outside diameter of the sleeve is made smaller than that of the hole by an amount barely sufficient to provide a sliding or slip fit.

Industry recognizes certain variations in available bushing heads as, for example, the slip renewable type where the head is interlocked with and released by direct and reverse rotation of the drill, and fixed renewable where the head may be releasably bolted to the jig. Still another example is that of a combined slip/fixed renewable bushing where the head is so constructed that it can serve either purpose.

Because of the need for precision in the use of tool bushings, the practice has largely been to make headed bushings of the type described by starting with an oversize sleeve of specified length and then machining or turning a portion of the length to the chosen outside diameter leaving the balance intact to serve as the head. Although the common practice described is productive of a serviceable head equipped bushing, there is appreciable work involved in production. The cutting away and disposition of extra relatively high priced semi-finished material from an oversized sleeve is also wasteful.

For some understanding of the magnitude of the inventories needed by suppliers of such drill bushings, it should be borne in mind that an effectively stocked inventory of press fit bushings could readily involve as many as 10,000 sizes of different inside diameter, outside diameter and length. The industry standard catalogs list 28 different outside diameter/inside diameter categories for headless press fit bushings alone and each category has an average of 8 different lengths and 15 different bore sizes for a possible combination of 94,080 sizes. Good practice suggests that there be stocked from 100 to 300 pieces of each size which would mean from 1,000,000 to 3,000,000 pieces where the average cost could be as much as $2.00 each.

To be ready to meet all types of demands, it should be appreciated that there should be inside diameter sizes for all twist drill diameters differing one from another by 1/64 inches covering a 1/64th minimum to a 3½inch maximum, all sizes differing one from another by one millimeter from 0.5 millimeters to 80 millimeters plus all letter type and number type drill sizes. There are over 330 standard twist drill sizes. There are corresponding reamer sizes.

A comparable inventory of head type bushings is also needed. One such which would be acceptable could involve as many as 5000 sizes for each of the three types, namely, the slip renewable, fixed renewable and slip/fixed renewable. Here again some 100 pieces of each size would be desirable and at a cost per piece greatly in excess of the cost per piece of the press fit bushings.

One step in reducing the inventory burden for the supplying industry with press fit and slip fit bushings in the various sizes and types is to provide a separate head which can be applied to a sleeve. One or another of a variety of different expedients may be preferable for different sets of circumstances.

It is therefore among the objects of the invention to provide a new and improved method of building and maintaining an inventory of drill bushings in a way which enables storage of a complete line of only one of a plurality of types accompanied by an expedient when occasion requires for readily converting quantities of the one type to those of another type.

Another object of the invention is to provide a new and improved method of building and maintaining an inventory of drill bushings which features storage of a single complete line of a simpler and less costly type of bushing accompanied by a partial line of accessory parts of a character enabling, when occasion requires, making use of accessory parts to create a supply of bushings of another type.

Still another object of the invention is to provide a new and improved method of inventory for drill bushings wherein when items from a simple and less expensive type are used with accessory parts to create a supply of bushings of another more complex type the newly created bushings are of character less costly to produce than bushings of such character which are normally available.

Further among the objects of the invention is to provide a new and improved inventory method for drill bushings for the supplying of orders to customers which enables a measurable lowering of the cost of the inventory and resulting saving in the delivery cost to customers, all of this under circumstances where a plurality of different types of bushings are available from an inventory which normally store a complete line of only one type.

Included also among the objects is to provide a new and improved inventory method for tool bushings capable of supplying bushings of different sizes and lengths in two or more different types from an inventory which need be complete as to only one of the types supplied.

With these and other objects in view, the invention consists of the construction, arrangements, and combination of the various parts of the device serving as an example only of one or more embodiments of the invention, whereby the objects contemplated, as disclosed in the specification and drawings and pointed out in the appended claims.

IN THE DRAWINGS;

FIG. 1 is a vertical sectional view of a slip renewable type of drill bushing assembled in place on a drill jig.

FIG. 2 is a vertical perspective exploded view of the device of FIG. 1.

FIG. 3 is a vertical perspective view of the device of FIGS. 1 and 2.

FIG. 4 is a vertical sectional view of a second form of mounting the device in a drill jib on the line 4—4 of FIG. 5.

FIG. 5 is a plan view of the mounting of FIG. 4.

FIG. 10 is a vertical sectional view of a drill bushing with an adjustable head assembled in place on drill jig.

FIG. 11 is a vertical perspective exploded view of the bushing of FIG. 10.

FIG. 12 is a vertical sectional view of another form of drill bushing with an adjustable head mounted in a drill jig on the line 12—12 of FIG. 13.

FIG. 13 is a plan view of the bushing of FIG. 12.

FIG. 14 is a vertical perspective view of the head of the bushing of FIGS. 12 and 13.

FIG. 15 is a vertical perspective view of still another form of head for the bushing.

Figure 6:
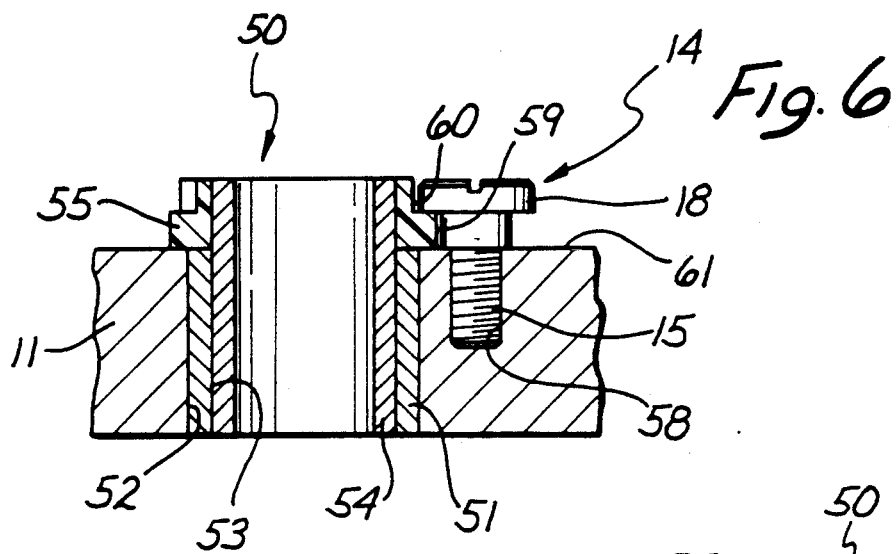
FIG. 6 is a vertical sectional view of fixed renewable type of drill bushing and form of mounting in a drill jig.

When there is to be supplied from inventory an order for headed drill bushings 10 productive of installation in a drill jig 11, as in FIG. 1, they may be of the type indicated and commonly referred to as slip renewable bushings. The drill bushing as shown consists of a sleeve 12 and a part designated as a head 13. The drill bushing is held in place on the jig 11 by a retention means, here shown as a shoulder bolt 14. On this occasion the shoulder bolt 14 is attached to the drill jig by a threaded shank 15 on one side of a bore 16 extending through the drill jig. There is a bolt head 18 forming a shoulder above a clearance section 19. The outside surface 20 of the sleeve 12 provides a snug sliding fit in the bore 16.

For the slip renewable bushing exemplified in FIGS. 1-3, the head 13 is specially formed with a recess 21 above which is a cut-out section 22 forming a track 23 in turn supported by a wing 24. When the slip renewable bushing is to be mounted in the jig for operation, it is set in a position where the recess 21 passes the bolt head 18. The bushing is then rotated so that the bolt head serving as a should rides over the track 23 to the position of FIG. 1 where the bolt head engages a blocking shoulder 25. The head 13 may, if desired, have the exterior circumference provided with channeling 26 to afford a better grip when being rotated. Forms of retention components other than the slip renewable heads may also be employed.

For completing the assembly of the head 13 with the sleeve 12, the head is drilled with an inside diameter 27 adapted to receive the sleeve. The attachment may then be completed by use of an appropriate high temperature adhesive, braze, solder, weld or the like.

It is important to note that for supplying the order for bushing, two separate pieces are store in inventory. One of these consists of the sleeves 12 which are in practice headless press fit bushings. The press fit inventory is complete and comprehensive containing sleeves of all graduations of inside diameters of an interior passage 30 for all sizes of drill bits, reamers, taps, and the like, as measured in the English system, the metric system, letter sizes and number sizes, together with corresponding outside diameters. All variations in length for both inside diameters and outside diameters are included.

Many suppliers of drill bushings in the current market stock three varieties of slip fit type bushings identified commercially as slip renewable, fixed renewable and slip/fixed renewable. As a result, three inventories of headed bushings need to be carried, one for each of the different varieties instead of a single variety as in the case of the press fit type drill bushing. The result is an obviously more costly inventory, even though fewer sizes may be stocked.

An essential object of the inventory method here disclosed is to eliminate the need for an inventory of slip fit type bushings. This is accomplished in part by making and storing what may aptly be termed a sub-inventory of separate heads made so that the heads can be mounted on press fit bushings of specified inside and outside diameters.

An additional need is also satisfied. This is to so construct the heads that they can be mounted at any selected location throughout the length of the press fit bushing to provide a specified below head length. What is needed is to initially select a press fit bushing with at least enough extra length to allow for the axial thickness of the head.

A further factor which needs to be satisfied is to have the outside diameter of the sleeve portion of each headed slip fit bushing small enough to slip freely into the hole in the jig which is provided for it, unlike the tight fitting hole necessary for a press fit bushing. As previously discussed, this consists of grinding from the outside diameter a thickness of material sufficient to provide for the slip fit of the sleeve. In practice a thickness of from 0.0001" to 0.0005" is usually found to be an acceptable amount.

The reduction in outside diameter of the designated amount is compensated for in its attachment to the inside diameter of the head. When the sub-inventory of heads is set up, these inside diameters are determined having for their purpose subsequent attachment to the sleeve. Other representative expedients are disclosed in addition to the slip fit bushing of FIGS. 1-3.

In FIGS. 4 and 5 there is shown a second form of mounting 35 for the headed drill bushing 10 of FIGS. 1 and 2. The mounting features a headed liner with a sleeve element 36 which is fixed in a bore 37 in the jig 11 with an acceptable bond.

A circumferentially extending flange 38 at an upper end of the headed liner overlies an upper surface 39 of the jig 11 and has a radially outwardly extending wing 40. At the outer edge of the wing 40 is post section 41 at the top of which is a radially inwardly extending lip 42.

When the drill bushing is to be attached in position, the sleeve 12 is extended freely into a central bore 43 of the sleeve element 36 with the recess 21 in alignment with the lip 42. Once past the lip and the bushing rotated, the cam track 23 slides beneath the lip 42 until the blocking shoulder 25 engages the corresponding side of the lip 42. Upon reverse rotation of the drill bushing 10 until the recess 21 again coincides with the lip 42, the drill bushing can be removed.

Figure 7:
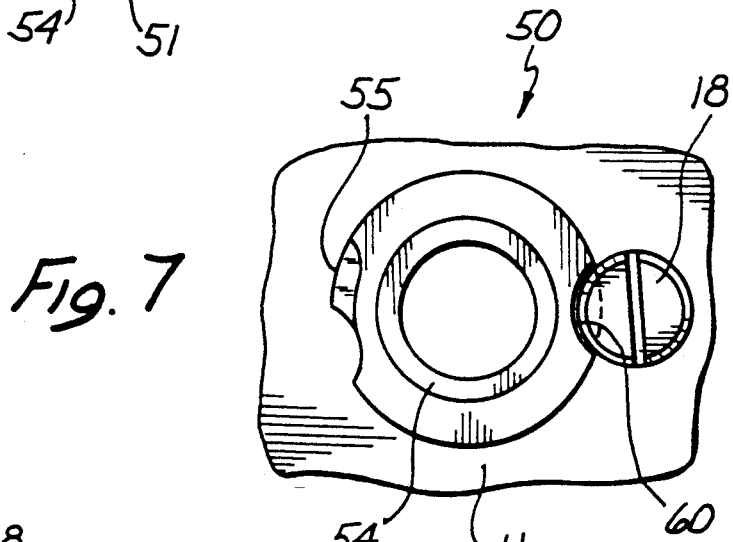
FIG. 7 is a plan view of the device of FIG. 6.

For the device as shown in FIGS. 6 and 7 a fixed renewable bushing 50 is provided for attachment to the drill jig 11. On this occasion, by way of example, a liner bushing 51 may be press fit or otherwise lodged in a hole 52 in FIG. 11. The liner bushing is provided with a bore 53 for reception of a sleeve element 54 of the drill bushing 50 with an appropriately sized interior passage 54. The same inventory practice is employed here as has previously been described. Heads 55 of various sizes respecting inside and outside diameters are stocked. When the corresponding headed bushing is ordered, the head is anchored to an appropriately sized sleeve element 54 at the proper location to provide the specified below head length. It will be understood that any excess length in bushing 50 will extend above head 55. An acceptable anchoring technique will depend in part on the material of which the head is molded.

For anchoring the drill bushing in operative condition on the jig 11 there is provided the shoulder bolt 14 having its threaded shank 15 inserted in a tapped hole 58 of the jig. The head 18 on the shoulder bolt extends outwardly providing the necessary shoulder to overlie a complimentarily acting shoulder 59 at the bottom of a recess 60. By having the head 18 of diameter sufficiently large to fill the recess 60, adequate holding action is assured when the shoulder bolt is applied, holding the head in snug engagement with the upper surface 61 of the jig 11 as well as overlying the top of the liner bushing 51. Mounted as described, when the fixed renewable bushing is to be removed and replaced with another, the shoulder bolt is unscrewed, the bushing lifted out and another replaced in the bore 53, and the shoulder bolt reapplied.

Figure 8:
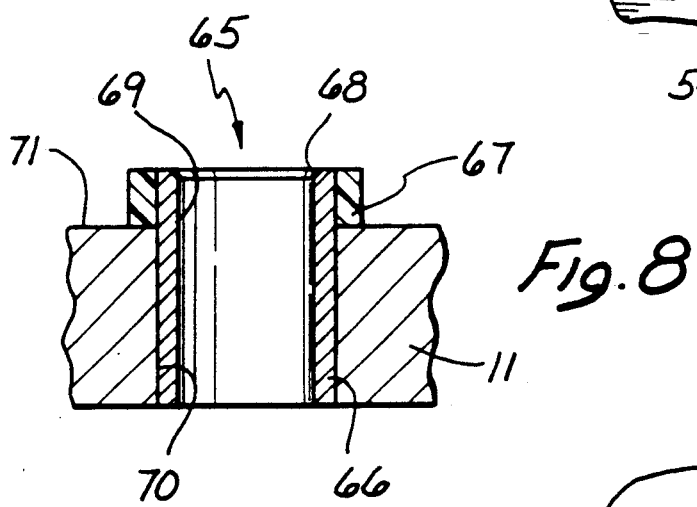
FIG. 8 is a vertical cross-sectional view of another form of device suited to the method.
Figure 9:
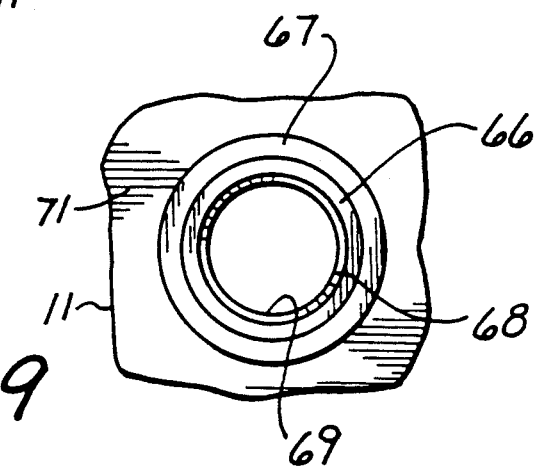
FIG. 9 is a plan view of the device of FIG. 8.

A simpler form of headed bushing 65 is shown in FIGS. 8 and 9 mounted in anchored position in a drill jig 11. A sleeve element 66 of tempered steel there shown is provided with a head 67. On this occasion also the head is of composition different from the sleeve, namely, one or another of the previously disclosed composite materials capable of being fabricated by a separate operation. In the simple form of FIGS. 8 and 9 the head lends itself to being one cut, for example, from a piece of stock material initially tubular in form.

With the head having been firmly bonded to the sleeve, a chamfer 68 may be formed at the entrance end of a bore 69.

When a permanent mounting is acceptable, the drill jig may be fabricated with a hole 70 to provide a press fit with the sleeve element 66 driven into a position where the head 67 is in engagement with a top surface 71 of the jig.

In this form of headed bushing, the grinding operation on the outside surface of the sleeve element is omitted. The assembly step alone of anchoring the separate head to the sleeve element, namely, the press fit bushing, is sufficient.

In one embodiment of a bushing which makes use of an adjustable head there is shown, as in FIGS. 10 and 11, a drill bushing, indicated generally by the reference character 75, consisting of a sleeve 76 and head 77. In assembled form the drill bushing has been mounted on a drill jig 78. In this form of the device the head 77 has a central opening 79 made to a size neatly fitting over the outside surface of the sleeve 76.

In fabrication the sleeve 76 may be cut from a steel tube capable of being tempered to a hardness acceptable for long periods of use as a guide for tools of the character of a twist drill. The exterior circumference of the tube may be drawn to the desired size prior to tempering as well as the circumference of an interior passage 80 which accommodates the drill bit. Should tubing of precisely the desired dimension not be available, a rod of comparable outside dimension may be resorted to with the passage 80 drilled prior to tempering.

It is of consequence to note that the head 77, however it may be formed, is a piece separate and independent of the sleeve 76 and may be of any desirable material capable of being applied to the upper end of the sleeve and securely fastened in place. In choosing an appropriate material for the head, one of a variety of metallic and non-metallic compositions may be found acceptable. Among such compositions may be a thermoplastic or thermosetting material such as a synthetic plastic resin, including, for example, polyethylene, polycarbonate or an acrylic of the character of Nylon or Delrin. The chosen plastic material may be fiberglass filled, if desired. The head may, if desired, be cast as a block and subsequently machined to the correct form and size or, on occasions, precast in the desired form, especially where a sintered material such as pressed sintered powder metal is employed. What is significant is that the head, although of necessity being tough and resistant, may be made of a material easily machined or easily cast or molded, and need not be of steel capable of being tempered to the degree of hardness required of the sleeve. Heat shrink plastic may be used if desired. In general plastic materials are used only where low torque is to be experienced.

In selecting the material of the head and the forming of the head, an appropriate mode of attachment to the sleeve is of material consequence. As has been previously noted, should an adhesive be resorted to, an appropriate fit of the central opening 79 with respect to the outer circumference of the sleeve 76 capable of application of an appropriate adhesive must be assured. Shrink fits may be employed if desired. Generally, high temperature adhesives have been found to be suitable. When a high temperature adhesive is used the outside diameter of the sleeve is preferably about one thousandths of an inch less than the inside diameter of the head so as to provide room for the adhesive.

In the form of the invention of FIGS. 10 and 11, some relaxation in the snugness of the fit may be tolerate. As shown here, the sleeve 76 has a smooth surfaced exterior and its head 77, which serves as a bushing head, is a separate piece. On this occasion, after the head has been applied over the upper end of the sleeve 76, it is adapted to be fastened by use of a set screw 81 projected into a tapped hole 82 through the wall of the head. When mounted for use, the drill bushing is held in the drill jig 78 by use of a liner 83 having a press fit in a properly sized hole 84 in the jig 78. The liner 83 in turn has a bore 85 of a size providing a slip fit for the sleeve 76 of the bushing.

In still another form of bushing with an adjustable head, as in FIGS. 12, 13 and 14, a drill bushing 89 comprising in part a sleeve 91 is provided with a head 92 having an inside bore 90 and flanges 93, 94 on opposite sides of a space 95. A conventional cap screw 96 projects through a clearance hole 97 in the flange 93 into engagement with a tapped hole 98 in the opposite flange 94. Space 95 may be of such dimensions as to permit head 92 to be used on a range of sleeves with slightly different outside diameters.

For mounting, the head has a recess adapted to pass a bolt head 101 of a shoulder bolt 102. Above the recess is a cut-out section 103 which forms a cam track 104 and at the opposite end a stop 105.

There is shown, also by way of example, in FIGS. 12 and 13 the drill jig 78 in which is mounted a liner 106 having, as previously described, a press fit in a hole 107 of the drill jig. The shoulder bolt 102 has its threaded end 107 located so that the head is in a position to overlie the cam track 104 when the head 92 is rotated to the position of FIGS. 12 and 13. As a consequence of having the head 92 adjustable with respect to the sleeve 91, a sleeve which has a length in excess of the thickness of the drill jig 78 may be used. A lower end 109 of the liner 10 maybe set relatively close to a workpiece 108 with an upper end 110 extending above an upper surface 67 of the drill jig.

The referred to adjustability of the head on the sleeve is a material feature in the method of inventory. By reason of this the below-head length of specification for the bushing can be readily met from the available inventory of press fit sleeves and separate heads. In general, where a very long bushing is used it is counterbored to a larger diameter for a part of its axial length so as to provide chip clearance and reduce wear and tear on the rotating tool.

As a further alternative, the head 92 may be provided with a recess 111 on the opposite side extending partway through the thickness of the head leaving a shoulder 112. To use the recess 111 as an expedient for fastening the drill bushing on the jig, the shoulder bolt is removed from the jig until the drill bushing is applied and then re-set with the bolt head 101 in engagement with the should 112. By reason of this dual alternative fastening expedient, the drill bushing disclosed in FIGS. 12-14 is commonly identified as a slip/fixed renewable bushing.

In a somewhat modified variety of adjustable head bushing 115 of FIG. 15, a head 116 provided with a central opening 117 has a tangentially disposed bore 118 being in alignment with a tapped hole 120 on the head portion at the opposite side of a cut 119. A cap screw 121 may be used provided with a hexagonal recess 122 for accommodation of a conventional hexagonal wrench. By this expedient the head 115 may be releasably attached to a sleeve like the sleeve 91 of FIGS. 12 and 13. As shown, the head 115 is provided with a recess 123 and cam track 124 of the same character as provided for the form of device of FIGS. 12, 13 and 14. A recess 125 may also be provided on the diametrically opposite side.

In general, the advantages of the present invention are maximized when the headless bushing sleeves are stocked in the standard press fit outside diameters. When a headed slip fit bushing is required the appropriate press fit bushing sleeve is selected, ground down to the required outside slip fit diameter, and the desired head is selected and applied. When there is a substantial ongoing demand for a particular slip fit bushing it may be desirable to manufacture headless bushing sleeves of the desired slip fit outside diameter and stock them. There are still considerable savings realized with this procedure as compared with making the sleeve and head from one integral piece.

In summary, as a part of the bushing in its various forms and styles as disclosed herein when a high degree of precision is not required, the sleeve may be cut from a steel tube capable of being tempered to a hardness acceptable for long periods of use as a guide for tools of the character of a twist drill. The exterior diameter of the tube may be drawn to the desired size prior to tempering as well as the diameter of an interior passage which accommodates the drill bit. Where tubing of sufficient precision is not available, a solid rod of comparable outside dimension may be resorted to with the interior and exterior diameters machined and ground to exact desired size.

The head in each instance, however it may be formed as a piece separate and independent of the sleeve, may be of any suitable material capable of being applied to the upper end of the sleeve and securely fastened in place. In choosing an appropriate material for the sleeve, one of the variety of materials previously disclosed may be found acceptable. It should be noted that slip fit renewable heads may be provided for both left and right handed operations. If a tool normally turns in a clockwise direction the bushing must release by turning counter-clockwise, and vice versa. Being able to select either a right or a left handed head for assembly with a given sleeve further reduces the amount of inventory which is required to supply the demand for tooling bushings.

The ability to position the head axially along the length of the sleeve so as to adjust the below head length of the assembled bushing permits the sub-inventory of sleeves to be reduced. A substantial range of below head lengths may now be accommodated by one sleeve length with considerable savings in inventory.

The headed drill bushings of the structures here disclosed and the manner in which they are constructed and assembled provides an especially advantageous inventory arrangement. As a consequence, there need be but a single inventory of sleeves and a single inventory of heads only. For those operations where a headed type bushing is needed, the added operation needed is to affix a head of the required character at the correct location on the specified sleeve. This may or may not require grinding a headless press fit sleeve to slip fit dimensions depending on the intended use. Where the outside diameter of the sleeve must be reduced it is simpler to grind down a headless sleeve than it is to grind down a headed sleeve. This is in contrast to what would otherwise be a complete second inventory of sleeves already machined with integral heads. Because of the higher initial cost of conventional bushings where sleeves and collars are machined together from the same stock material, the inventory practice inherent in the two-part method here disclosed is a marked advantage. This method provides a very quick response time to the requirements of customers throughout the entire range of tooling bushings. Many special orders can be supplied as quickly and easily as standard items. But for this system of inventory many items would become unavailable simply because the cost of stocking them or making them to special order is prohibitive. This would significantly impair the creativity of tooling designers in designing tooling to use these bushings.

While particular embodiments of the present invention have been shown and described, it will be obvious to those skilled in the art that changes and modifications may be made without departing from the invention in its broader aspects and therefore the aims of its appended claims are to cover all such changes and modifications as fall within the true spirit and scope of this invention.

Having described the invention, what is claimed as new in support of Letters Patent is as follows:

1. Method of providing a wide range of industry standard precision press fit and slip fit tool bushings on demand from an inventory of industry standard headless press fit bushings comprising:

maintaining an inventory of industry standard headless press fit tool bushings, said inventory including an assortment of headless press fit bushings of various standard lengths, standard inside diameters and standard outside diameters, said inventory being sufficient in quantity and assortment to meet anticipated customer demand for standard headless press fit bushings and to satisfy anticipated customer demand for slip fit bushings of standard lengths and inside diameters, said standard headless press fit tool bushings having outside diameters which are greater than those of corresponding standard slip fit bushings;

maintaining a sub-inventory of separate bushing heads of assorted sizes and sufficient in quantity to provide heads for customer demanded slip fit bushings;

selecting a first standard headless press fit bushing from said inventory responsive to a first customer's demand for a required standard slip fit bushing;

reducing the outside diameter of said first standard headless press fit bushing to the standard outside diameter for said required standard slip fit bushing whereby a second headless slip fit sized bushing is produced;

selecting a bushing head from said sub-inventory; and assembling said selected bushing head together with said second headless slip fit sized bushing to provide said required standard slip fit bushing.

2. Method of claim 1 including positioning said selected bushing head axially along said second headless slip fit sized bushing at a location between and spaced from the axial ends of said second headless slip fit sized bushing to provide a desired bushing length under the head.

3. Method of claim 1 including bonding said selected bushing head to said second headless slip fit sized bushing.

4. Method of claim 1 including clamping said selected bushing head to said second headless slip fit sized bushing.

5. Method of claim 1 including shrink fitting said selected bushing head onto said second headless slip fit sized bushing.

6. Method of claim 1 including selecting a bushing head from said sub-inventory which has an internal diameter substantially equal to that of said first standard headless press fit bushing, and said assembling includes bonding said bushing head to said second headless slip fit sized bushing.

7. Method of claim 6 wherein said bonding includes the application of an adhesive.

8. Method of claim 3 wherein said bonding includes the formation of a metallurgical bond.

9. Method of providing a wide range of industry standard precision press fit and slip fit tool bushings on demand from an inventory of industry standard headless press fit bushings comprising:

maintaining an inventory of headless press fit tool bushings, said inventory including an assortment of headless press fit bushings of various standard inside diameters, standard outside diameters and various lengths, said inventory being sufficient in quantity and assortment to provide at least a major part of anticipated customer demands for standard headless press fit bushings and to provide at least a major part of anticipated customer demands for slip fit bushings of standard lengths and inside diameters;

selecting a first standard headless press fit bushing from said inventory responsive to a first customer's demand for a required standard slip fit bushing;

reducing the outside diameter of said first standard headless press fit bushing to the standard outside diameter for said required standard slip fit bushing whereby a second headless slip fit sized bushing is produced; and mounting a bushing head on said second headless slip fit sized bushing whereby said required standard slip fit bushing is formed.

10. Method of claim 9 including casting said bushing head on said second headless slip fit sized bushing.

11. Method of claim 9 including manufacturing said bushing head responsive to said first customer's demand.

12. Method of claim 9 wherein said reducing includes grinding the outside diameter of said first standard headless press fit bushing.

* * * * *